(12) United States Patent
Federmann et al.

(10) Patent No.: US 8,314,516 B2
(45) Date of Patent: *Nov. 20, 2012

(54) SELF-REACTIVATING ELECTRICAL APPLIANCE

(75) Inventors: Marc Federmann, Sternenfels (DE); Martin Graw, Königsbach-Stein (DE); Volkmar Uebele, Bad Nauheim (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 393 days.

This patent is subject to a terminal disclaimer.

(21) Appl. No.: 12/598,206

(22) PCT Filed: Apr. 14, 2008

(86) PCT No.: PCT/EP2008/054504
§ 371 (c)(1),
(2), (4) Date: Oct. 30, 2009

(87) PCT Pub. No.: WO2008/135343
PCT Pub. Date: Nov. 13, 2008

(65) Prior Publication Data
US 2010/0090534 A1    Apr. 15, 2010

(30) Foreign Application Priority Data

May 4, 2007 (DE) .......................... 10 2007 021 066

(51) Int. Cl.
*H01H 83/00* (2006.01)

(52) U.S. Cl. ........................................ 307/125
(58) Field of Classification Search .................. 307/125
See application file for complete search history.

(56) References Cited

U.S. PATENT DOCUMENTS

| | | |
|---|---|---|
| 5,642,004 A | 6/1997 | Bircher |
| 2002/0085400 A1 | 7/2002 | Has |
| 2002/0190797 A1 | 12/2002 | Deppe et al. |
| 2007/0013234 A1 | 1/2007 | Ting |
| 2010/0123357 A1* | 5/2010 | Federmann et al. .......... 307/112 |

FOREIGN PATENT DOCUMENTS

| | | |
|---|---|---|
| DE | 19537600 A1 | 4/1997 |
| DE | 19652472 A1 | 6/1998 |
| DE | 10148644 A1 | 4/2003 |

* cited by examiner

*Primary Examiner* — Hal Kaplan
(74) *Attorney, Agent, or Firm* — James E. Howard; Andre Pallapies

(57) ABSTRACT

A household appliance including a wiring, a power supply unit, a switch actuated by the wiring, and an energy store. The power supply unit is connected to a power supply network and supplies power to controlled functional units of the household appliance and to the wiring. The switch, which is actuated by the wiring, disconnects the power supply unit from the power supply network on a primary side of the power supply unit and in an idle state of the household appliance. The energy store stores energy that keeps the switch open in the idle state of the household appliance.

13 Claims, 1 Drawing Sheet

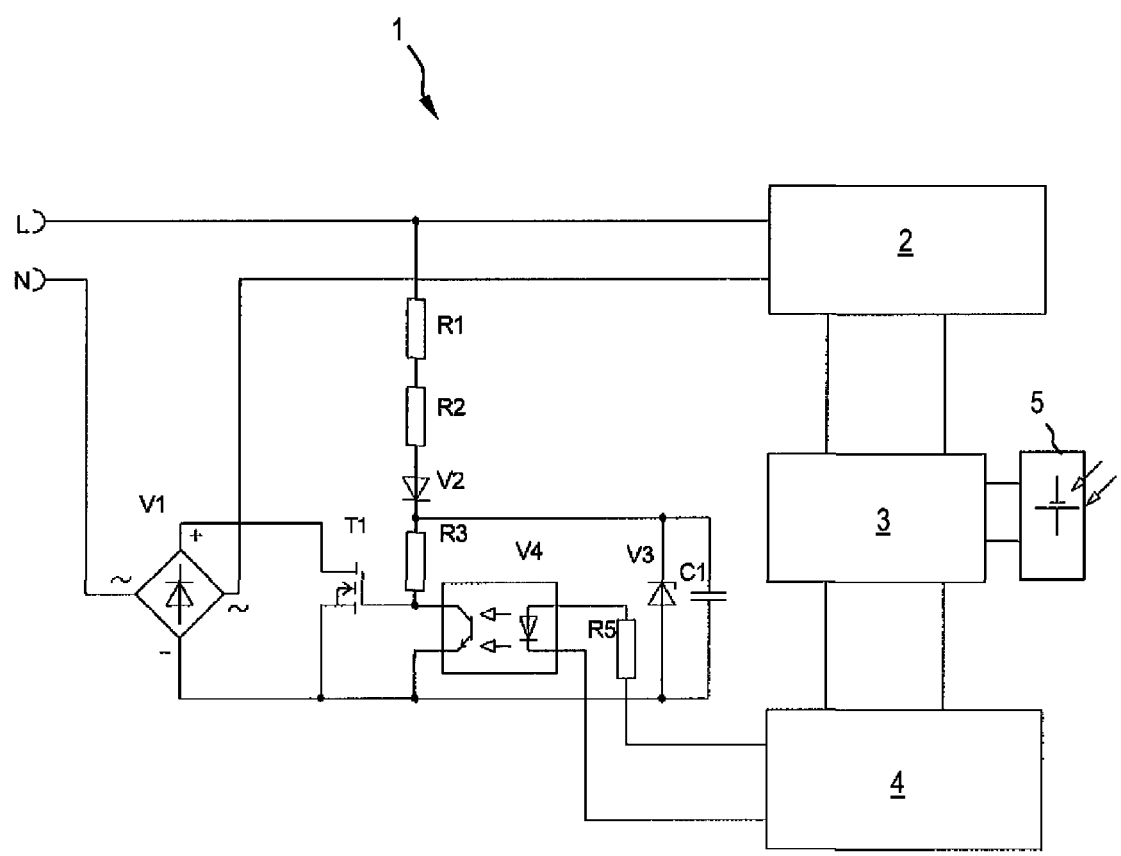

SELF-REACTIVATING ELECTRICAL APPLIANCE

BACKGROUND OF THE INVENTION

The invention relates to an electrical appliance, in particular a domestic appliance, comprising wiring and at least one power supply unit which is linked to a power supply network used to supply functional units of the electrical appliance to be controlled, and the wiring, and comprising a switch which disconnects the power supply unit of the electrical appliance, in the idle state, from the power supply network, on the primary side, and the wiring being used to actuate the switch.

DE 101 48 644 A1 discloses an electrical circuit for dimming the two half-waves of an alternating voltage, comprising a full rectifier bridge which with its alternating current inputs is connected by an inductive load linked in series to an alternating current source, and in the diagonals of the direct current outputs of which a field effect transistor is connected, in which the control voltage applied between gate and source is formed by an optocoupler operated synchronously with the alternating voltage.

DE 195 376 00 A1 and DE 196 52 472 A1 disclose an electronic circuit for energy saving in alternating voltage transformers in which a primary side electronic switch, for example a diac, interrupts a primary side electric circuit of a transformer, or closes it again (what is known as "Horstmann wiring").

DE 19932 453 A1 and WO 01/05132 A1 disclose an electrical appliance comprising a power supply unit, transformer power supply unit and control card for an electrical appliance. Obviously an electrical appliance comprising a control unit and at least one power supply unit, which is linked to a power supply network, can be switched by a switch and is used to supply functional units to be controlled, and the control unit, which can be connected via lines to a data network that is external to the appliance, via which control signals, in particular a call signal, are sent to the control unit to start a data transmission from or to the electrical appliance for this purpose. To achieve zero energy consumption when the electrical appliance is in standby mode the switch disconnects the power supply unit thereof, in the idle state, from the power supply network, and with its energy the call signal closes the electric switch. These documents therefore disclose Horstmann wiring connected by an external data line.

BRIEF SUMMARY OF THE INVENTION

It is the object of the present invention to create a possibility for reducing the energy consumption of an electrical appliance, in particular a domestic appliance, and corresponding wiring in standby which does not come to a standstill.

The electrical appliance, in particular a domestic appliance, comprises wiring and at least one power supply unit which is linked to a power supply network used to supply functional units of the electrical appliance to be controlled, and the wiring. A switch is provided to disconnect the power supply unit of the electrical appliance, in the idle state, from the power supply network, on the primary side. The switch is actuated by the wiring.

The electrical appliance also comprises an energy accumulator, for example a battery, which uses its energy to keep the electrical switch open in the idle state. The energy accumulator is preferably arranged on the secondary side with respect to the power supply unit and is powered or charged thereby.

The (hardware) wiring can be any element that is capable of keeping the switch open using the energy of the energy accumulator. To avoid additional components this is preferably the control unit which also controls the functional units of the electrical appliance, for example a microcontroller. To save additional power the wiring can, however, also be wiring specifically provided for the switch circuit, such as an ASIC or other logic unit, or a printed circuit, so the microcontroller can be switched off in standby mode. So the power consumption of the wiring is reduced in the idle state the wiring, or parts thereof, for example a microcontroller, is preferably transferred into a power-saving mode, for example what is known as a SLEEP mode, in the idle state.

As a result of the fact that the primary circuit is inevitably closed without further assistance when the energy accumulator has discharged itself or has fallen below a predefined charging level, and therefore the secondary circuit is also supplied with power again, the electrical appliance cannot come to a standstill or "become blocked". It can be reactivated at any time.

The wiring preferably monitors an operating state of the energy accumulator and when a predefined supply threshold is reached, for example an output voltage level of the energy accumulator, it actuates the switch such that the switch connects the power supply unit of the electrical appliance to the power supply network on the primary side. A voltage that can be used to power or re-charge the energy accumulator is again available at the secondary side as a result.

To extend the downtime in the idle state without switching on the primary circuit, for charging the energy accumulator is connected to an autonomous energy source, in particular to an autonomous energy source comprising a solar cell. Other autonomous energy sources are also conceivable however, for example thermal power generators or click sensors.

The object is also achieved by a circuit arrangement for an electrical appliance comprising an electrical switch for switching mains voltage, wherein, in the idle state, the switch is kept open by energy of the energy accumulator, the energy accumulator being charged at least when the mains voltage is switched on, i.e. during normal operation.

BRIEF DESCRIPTION OF THE DRAWINGS

The invention will be schematically described in more detail below with reference to an exemplary embodiment that should not to be seen to limit the invention.

FIG. 1 shows a sketch of a circuit arrangement for an electrical appliance.

DETAILED DESCRIPTION OF EXEMPLARY EMBODIMENTS OF THE PRESENT INVENTION

FIG. 1 shows a circuit arrangement 1 for a domestic electrical appliance, for example an extractor hood, an oven, a dishwasher or a washing machine, coffee machine, air conditioning system, etc. In this circuit arrangement 1 a low-voltage power supply unit 2, for example an electromagnetic or electronic transformer, is powered on the primary side by a power supply network L, N. On the secondary side a low voltage is applied to an energy accumulator 3, for example a battery, which in turn powers wiring in the form of a control unit 4, for example a microcontroller. The control unit 4 also controls functional units of the electrical appliance.

If the appliance is in the idle state or standby mode, a switch in the form of an optocoupler V4 is triggered or actuated by the wiring 4 such that the optocoupler V4 is opened and the power supply unit 2 of the electrical appliance is disconnected on the primary side from the power supply network L, N. The mains voltage is also isolated from a control voltage SELV, which is provided by the energy accumulator 3, by the optocoupler V4. An optocoupler V4 can typically be triggered by a current <1 mA.

More precisely, a gate source voltage of a MOSFET TI is about 0 V due to triggering of the optocoupler V4, whereby the MOSFET TI is disabled. The power supply unit 2 is disconnected from the power supply network L, N on the primary side as a result.

If the operating state of the appliance is requested or the buffer is empty, switch V4 is no longer triggered. The gate source voltage of the MOSFET TI then increases to the value of the Zener diode V3 arranged as shown, whereby the FET TI is conductive. Consequently the full rectifier bridge V1 is in turn connected in series with its alternating current inputs and the primary winding of the low-voltage power supply unit 2. Low voltage is now applied to the low-voltage power supply unit 2 on the primary side, whereby the wiring 4 is ready for use and the energy accumulator 3 can again be charged from the mains voltage or the low-volt direct voltage converted therefrom. To then transfer the domestic electrical appliance into the idle state the switch V4 is triggered via the wiring 4 and, more precisely, either by hand (for example after being manually switched on into the operating state) or automatically by the wiring 4 (for example after charging of the energy accumulator 3 following discharging). This arrangement also ensures that when the energy accumulator 3 is empty at the start, or following a relatively long downtime or disconnection from the supply, the circuit arrangement 1 is immediately ready for use.

The energy accumulator 3 can optionally also be charged by means of a solar cell 5. This reduces the standby power consumption further as the energy accumulator 3 only has to be recharged at comparatively long intervals. The energy accumulator 3 is preferably designed in such a way that in the case of normal operation it can keep switch V4 open for the entire standby time. By way of example, the energy accumulator 3 for an oven or an extractor hood can be designed for a downtime of 2 to 3 days, during which the appliance is conventionally properly switched on.

The function and mode of operation of the additional elements illustrated will be clear to a person skilled in the art after reading the above description. Therefore a Zener diode V3 is provided to limit a voltage at gate G of the MOSFET T1. The diode V2 ensures that only a rectified control voltage is applied to the MOSFET T1. The full rectifier bridge V1 is used for poling or ensuring the phase position of the MOSFET T1.

The illustrated circuit arrangement can be extended such that it can be designed as an energy-saving circuit (as shown above) and as a dimmer circuit. In particular if the low-voltage power supply unit 2 is configured as an electronic, separated or integrated transformer, its dual use as low-voltage supply source and as low-volt lighting source is enabled. The lighting is then switched off or on in a secondary manner. An additional feedback loop for detecting the zero crossing and phase position (not shown) is installed, preferably by means of the optocoupler, for simultaneous use of the circuit arrangement as a dimmer and energy-saving circuit. A voltage doubling circuit connected downstream is also preferably provided to be able to generate a sufficiently large secondary voltage (for example of 12 V direct voltage) in the dimmed state.

The above circuit arrangement is not limited to the above form or application. The basic principle can, for example, be transferred to Horstmann wiring. The circuit arrangement can basically also be used with switching power supplies or other electrical appliances. Furthermore, the optocoupler, or the switching elements associated therewith, by way of example, may be replaced by other switches, such as a diac or triac. Alternatively switches that are not isolating, for example a transistor, may also be used, wherein the circuit arrangement should then be configured such that disruptions between primary side and secondary side are avoided.

The wiring may also be set up such that it closes the switch after a predefined supply threshold has been reached in the energy accumulator, in order to prevent total discharge of the energy accumulator. Such a threshold can be a voltage level of the energy accumulator.

LIST OF REFERENCE NUMERALS 1 circuit arrangement
2 power supply unit
3 energy accumulator
4 wiring
5 autonomous energy source
L power supply network
N power supply network
R resistor
C capacitor
T1 field effect transistor
V1 full rectifier bridge
V2 diode
V3 Zener diode
V4 switch

The invention claimed is:

1. A household appliance, comprising:
   a wiring which controls functional units of the household appliance;
   a power supply unit connected to a power supply network and to supply power to the controlled functional units of the household appliance and to the wiring;
   a switch actuated by the wiring to disconnect the power supply unit from the power supply network on a primary side of the power supply unit and in an idle state of the household appliance; and
   an energy store on a secondary side with respect to the power supply unit to store energy that keeps the switch open in the idle state of the household appliance.

2. The household appliance of claim 1, wherein the energy store powers the wiring.

3. The household appliance of claim 1, wherein the wiring monitors an operating state of the energy store, and wherein, when a predetermined supply threshold is reached, the wiring actuates the switch such that the switch connects the power supply unit to the power supply network on the primary side of the power supply unit.

4. The household appliance of claim 1, further comprising an autonomous energy source connected to the energy store to charge the energy store.

5. The household appliance of claim 4, wherein the autonomous energy source comprises a solar cell.

6. A circuit arrangement for a household appliance, comprising:
   an electrical switch to switch a mains voltage of a power supply network; and
   an energy store to store energy that keeps the electrical switch open in an idle state of the household appliance, wherein the energy store is charged when the mains voltage of the power supply network is switched on by the electrical switch, and wherein the mains voltage is isolated from a control voltage provided by the energy store during the idle state.

7. The electric circuit of claim 6, wherein the energy store is arranged on a secondary side with respect to the power supply network.

8. A household appliance, comprising:
- a power supply unit connected to an external power supply network and to supply power to the household appliance;
- a switch to disconnect the power supply unit from the external power supply network in an idle state of the household appliance; and
- an energy store to store energy that keeps the switch open in the idle state of the household appliance, wherein during normal operation of the household appliance, the energy store keeps the switch open for the entire idle state.

9. The electric circuit of claim 8, wherein the energy store is arranged on a secondary side with respect to the external power supply network.

10. An electrical circuit of a household appliance, the electrical circuit comprising:
- an electrical switch to one of turn on and turn off a mains voltage of an external power supply network connected to the household appliance; and
- an energy store that is charged with energy when the mains voltage of the external power supply network is turned on by the electrical switch, wherein the energy store keeps the electrical switch open in an idle state of the household appliance, and wherein the mains voltage is isolated from a control voltage provided by the energy store during the idle state.

11. The electric circuit of claim 10, wherein the energy store is arranged on a secondary side with respect to the external power supply network.

12. A system, comprising:
- a power supply unit of a household appliance that supplies power to the household appliance;
- a power supply network external to the household appliance;
- an electrical switch that connects the power supply unit to the power supply network and that, if the household appliance is in an idle state, disconnects the power supply unit from the power supply network; and
- an energy store arranged on a secondary side with respect to the power supply unit that is charged with energy when the electrical switch connects the power supply unit to the power supply network and that keeps the electrical switch open in the idle state of the household appliance.

13. The electric circuit of claim 12, wherein a mains voltage of the power supply network is isolated from a control voltage provided by the energy storage during the idle state.

* * * * *